(12) United States Patent
Wieser

(10) Patent No.: US 7,118,344 B2
(45) Date of Patent: Oct. 10, 2006

(54) WIND POWER PLANT FOR GENERATING ENERGY

(75) Inventor: Gerhard Wieser, Schiedlberg (AT)

(73) Assignee: Gudrun Wieser, Schiedlberg (AT)

( * ) Notice: Subject to any disclaimer, the term of this patent is extended or adjusted under 35 U.S.C. 154(b) by 147 days.

(21) Appl. No.: 10/486,277

(22) PCT Filed: Aug. 7, 2002

(86) PCT No.: PCT/AT02/00238

§ 371 (c)(1),
(2), (4) Date: Aug. 16, 2004

(87) PCT Pub. No.: WO03/014562

PCT Pub. Date: Feb. 20, 2003

(65) Prior Publication Data

US 2004/0265130 A1    Dec. 30, 2004

(30) Foreign Application Priority Data

Aug. 8, 2001   (AT)   ................................ A 1238/01
Oct. 17, 2001  (AT)   ................................ A 1646/01

(51) Int. Cl.
*B23H 1/16* (2006.01)

(52) U.S. Cl. .................... 416/189; 416/198 R; 416/63; 415/4.4; 415/221; 415/228; 415/123

(58) Field of Classification Search ................ 415/4.4, 415/4.5, 185, 211.2, 221, 228, 122.1, 4.2, 415/123; 416/63, 189, 198 R; 290/44, 55
See application file for complete search history.

(56) References Cited

U.S. PATENT DOCUMENTS

| 2,137,559 | A | * | 11/1938 | Algee | 416/189 |
| 4,116,581 | A | * | 9/1978 | Bolie | 415/4.4 |
| 4,324,985 | A | * | 4/1982 | Oman | 290/55 |
| 5,155,375 | A | * | 10/1992 | Holley | 290/44 |
| 5,844,324 | A | * | 12/1998 | Spriggle | 290/55 |

FOREIGN PATENT DOCUMENTS

| DE | 33 23 200 | 1/1985 |
| EP | 0 045 264 | 2/1982 |
| FR | 529 301 | 11/1921 |
| FR | 2 488 337 | 2/1982 |
| GB | 695 519 | 8/1953 |

* cited by examiner

*Primary Examiner*—Ninh H. Nguyen
(74) *Attorney, Agent, or Firm*—Collard & Roe, P.C.

(57) ABSTRACT

A wind power system (1) for generating power is proposed, comprising a rotor which is axially flowed through, is rotatably held on a shaft (2) and is provided with blades (3), as well as a guide device (5) which accelerates the air flow through the rotor (4). In order to provide advantageous conditions for generating power it is proposed that the guide device (5) consists of several flow conduits (6) tapering in the direction of flow, which conduits are arranged on the rotor (4) in a distributed way in the manner of a rim around the shaft (2), that the blades (3) are associated with one flow conduit (6) each and that the rotor (4) comprises an outside jacket (7) enclosing the same.

11 Claims, 8 Drawing Sheets

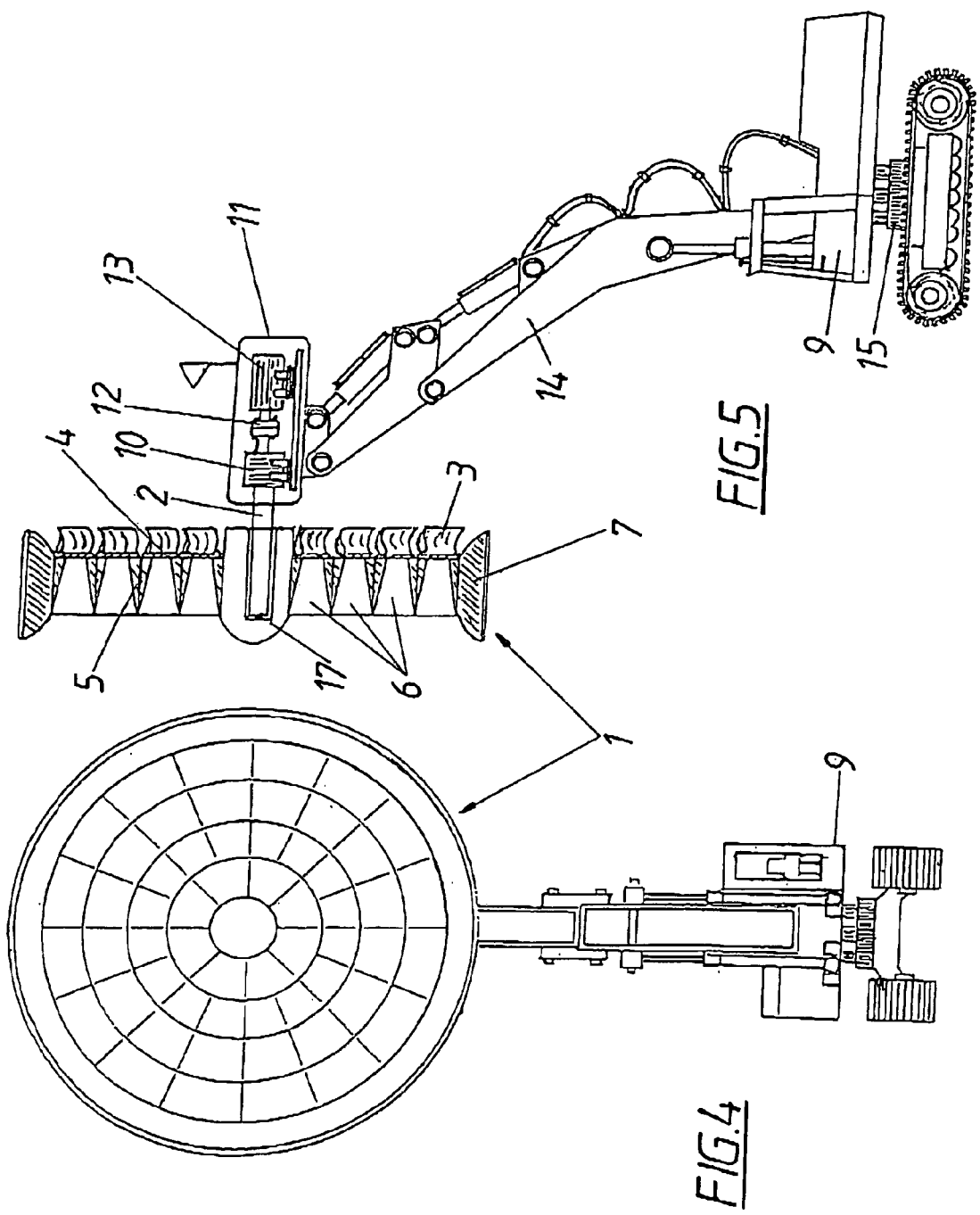

WIND POWER PLANT FOR GENERATING ENERGY

CROSS REFERENCE TO RELATED APPLICATIONS

Applicants claim priority under 35 U.S.C. §119 of Austrian Applications No. A 1238/01 filed on Aug. 8, 2001 and A 1646/01 filed on Oct. 17, 2001. Applicants also claim priority under 35 U.S.C. §365 of PCT/AT02/00238 filed on Aug. 7, 2002. The international application under PCT article 21(2) was not published in English.

1. Field of the Invention

The invention relates to a wind power system for generating power with a rotor which is axially flowed through, is rotatably held on a shaft, is provided with blades and is provided with a guide device which accelerates the air flow through the rotor.

2. Description of the Prior Art

Conventional wind power systems usually have propeller-like rotors which are aligned in or against the wind direction for producing power. Known rotors come with the disadvantage however that their efficiency is exceptionally low especially at low wind speeds and at smaller diameters. In order to improve this it is known (DE 33 23 200 A) to supply the air to the rotor via a funnel-like guide device. The guide device has a nozzle-like shape tapering up to the turbine wheel which is to accelerate the air flow through the rotor. Such known wind power systems have a considerable size (and especially length), which is why they can hardly be used extensively in a commercial way, especially in the private field.

SUMMARY OF THE INVENTION

The invention is thus based on the object of remedying these deficiencies and to provide a wind power system of the kind mentioned above which utilizes the available wind power in the best possible way at a compact size of the plant.

This object is achieved by the invention in such a way that the guide device consists of several flow conduits tapering in the direction of flow, which conduits are arranged on the rotor rim in a distributed manner around a shaft, that the blades are associated with one flow conduit each and that the rotor comprises an outside jacket enclosing the same.

A relevant share in increasing the efficiency of the wind power system in accordance with the invention is that virtually the entire projecting basic surface of the rotor will utilize the air flow, for which purpose it comprises the plurality of flow conduits for the air flow which are arranged in a rim-like distributed manner about the shaft, which individual flow conduits are each associated with a rotor. Each flow conduit thus comprises its own guide device with which it guides the air flow to the respective blades. As a result of the special embodiment of the individual flow conduits and the provision of the outside jacket which encloses the rotor, the dynamic pressure in front of the rotor is increased in addition, thus additionally accelerating the air flowing through the rotor. The blades can be provided for example in the flow conduits right up to the end of the flow conduit or even beyond the end of the flow conduit. If a construction is to be provided which is simple with respect to its design, then it is recommended to situate the blades downstream of the respective flow conduit.

Especially advantageous conditions are obtained for wind power systems when the flow conduits expand again after their tapering. The individual flow cross sections are then provided with a nozzle-like arrangement and a maximum flow speed is obtained in the region of the blades. In order to enable the use of the wind power system in accordance with the invention over a large speed range of an air flow in the best possible way, the blades are provided with an adjustable configuration, so that the angle of attack of the blades can be adjusted to the respectively prevailing air flow.

According to an advantageous further development of the invention, guide walls are arranged in the flow conduits before blades which guide the air flow towards the blades. These guide walls can be guide rails for example which are positioned in an inclined fashion and which redirect the air flow towards the center of the flow conduit.

In order to ensure the most constant speed of the rotor during gusty wind conditions for example, a disk flywheel can be associated which the rotor, which disk flywheel is held coaxially to the rotor and which is detachably connected with the rotor by means of a coupling. The disk flywheel is detached from the rotor during the start-up process for example in order to thus reduce the moment of inertia of the rotor and in order to accelerate the start-up process especially during low wind intensities. Once the rotor has reached its desired operating speed, the flywheel can then slowly be coupled with the rotor and thus finally be used as an energy storage means for compensating fluctuations in the rotational speed. An especially high moment of inertia and thus compensation capability for speed fluctuations and simple constructional conditions are obtained when the disk flywheel is arranged in the outer jacket of the rotor.

If a mobile use of the wind power unit in accordance with the invention is desired, it is erected on a carrying vehicle. Said carrying vehicle can be an excavator on whose boom the wind power unit is mounted. The tracking of the wind is governed in this case via the live ring of the chain vehicle. With out any additional means the chain vehicle can easily reach locations outside that are otherwise difficult to access.

If the efficiency of the wind power unit in accordance with the invention is to be increased even further or if the available wind power is to be utilized even better it is proposed that the rotor is provided downstream with an auxiliary rotor which is situated on an extra shaft and is axially flowed through. The auxiliary rotor can be provided with a conventional rotor blade system for example, which rotor blades are preferably configured for being adjustable for adaptation to the respective conditions.

The wind power system in accordance with the invention is arranged on a mast or the like with a horizontal rotational axis aligned against the wind or the rotor is held with a vertical axis in a tower which comprises a tower head which is adjustable coaxially to the rotor and comprises a pipe elbow which deflects the horizontal wind flow against the rotor, as result of which the pressure difference between upper and lower side of the tower, i.e. between inlet and outlet, can be used for winning power. If the wind speed is to be additionally increased by the rotor, then it is advantageous when the flow connection of the pipe elbow to the rotor narrows in the direction of flow.

In order to enable the use of either the rotor or the auxiliary rotor as guide device for the respective other rotor in operation, the rotor and/or the auxiliary rotor are associated with a braking device with which either the one or the other wheel can be braked until standstill.

BRIEF DESCRIPTION OF THE DRAWINGS

The invention is now explained in closer detail by reference to an embodiment which is schematically shown in the drawings, wherein:

FIGS. 4 and 5 show an embodiment of the wind power system of FIGS. 2 and 3 in a front and side view;

DESCRIPTION OF THE PREFERRED EMBODIMENTS

Figure 3:
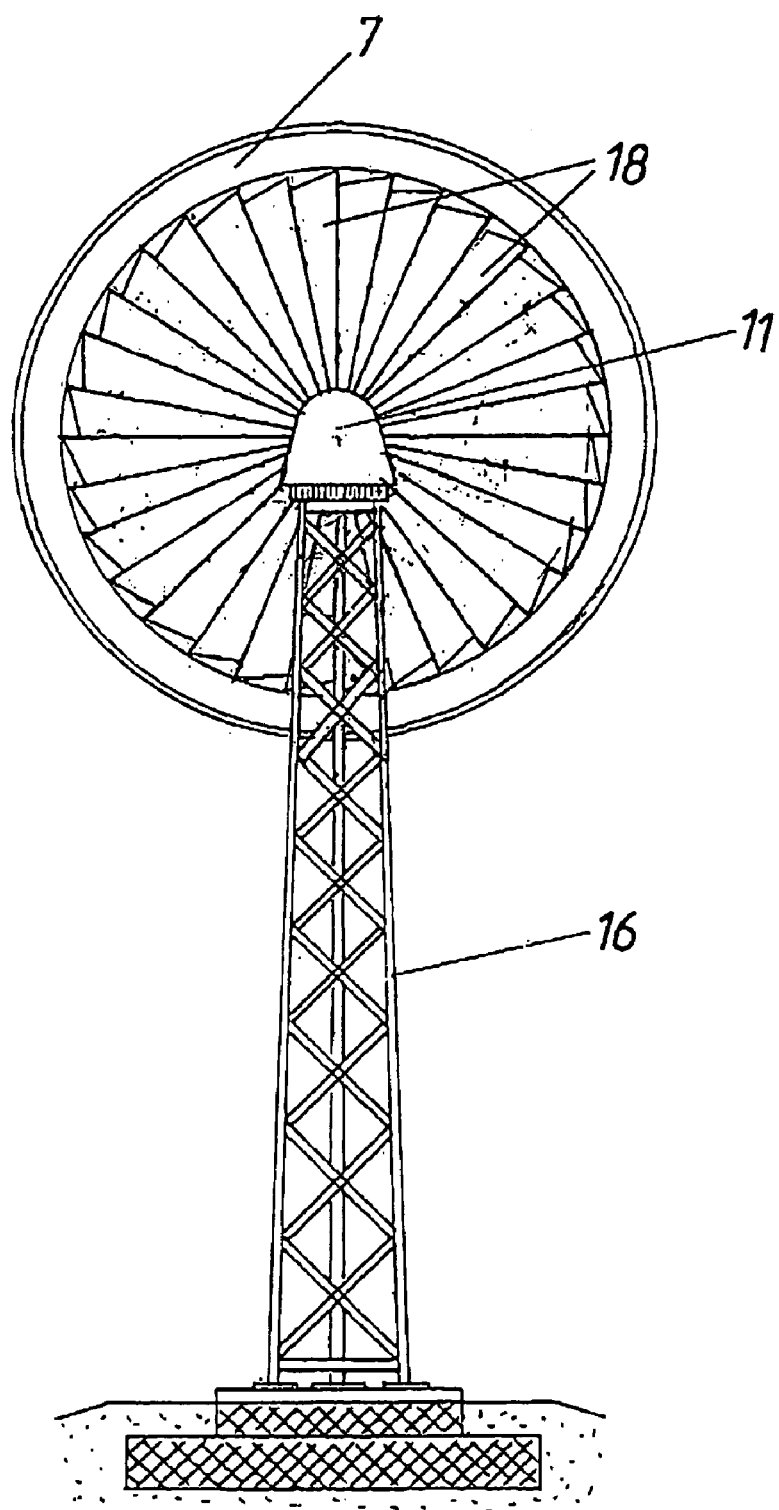
FIG. 3 shows the wind power system of FIGS. 1 and 2 in a rear view with an auxiliary rotor situated downstream of the of the rotor.
Figure 6:
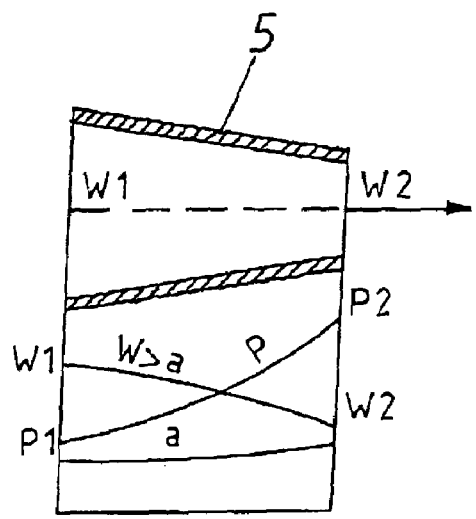
FIG. 6 shows a speed and pressure distribution schematic for a flow conduit.
Figure 7:
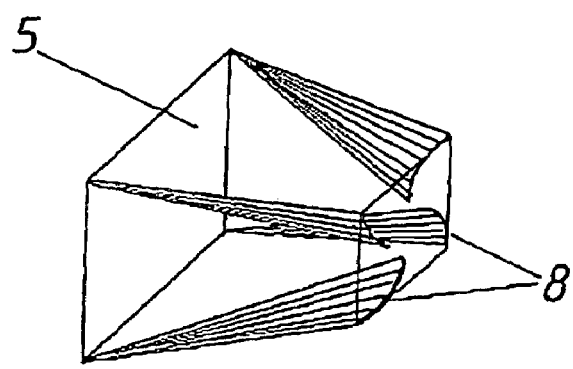
FIG. 7 shows an embodiment for rotor blades.

A wind power system 1 for generating power substantially consists of a rotor 4 which is flowed through axially, is fastened to a shaft 2 and is provided with rotor blades 3, and of a guide device 5 which accelerates the air flow through the rotor 4. The guide device 5 is composed of several flow conduits 6 which taper in the direction of flow. Said flow conduits 6 are arranged in a rim-like manner with their guide devices 5 on the rotor 4 distributed around the shaft 2 in order to utilize the air flow over the entire cross section of the rotor 4 against which the air flows. The blades 3 are each situated downstream of a flow conduit 6 and the rotor 4 comprises an outside jacket 7 which encloses the same. Said outside jacket has the shape of a concentric nozzle in order to increase the dynamic pressure in front of the rotor 4. Similarly, the rim-like guide devices 5 increase the dynamic pressure. Downstream of the rotor 4 there is an auxiliary rotor 18 which is not shown in closer detail and, like the rotor, is axially flowed through for the purpose of better utilizing the wind power (FIG. 3). The auxiliary rotor 18 also drives a generator.

Figure 8:
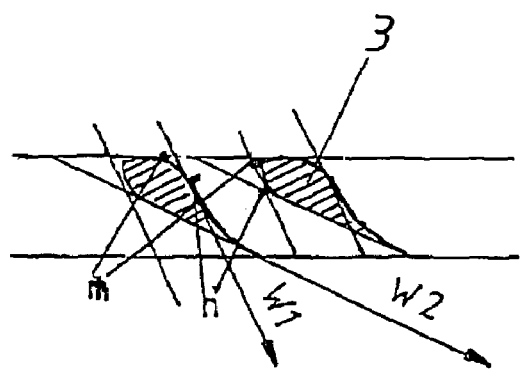
FIG. 8 shows an embodiment for motor blades forming tapering flow conduits.
Figure 9:
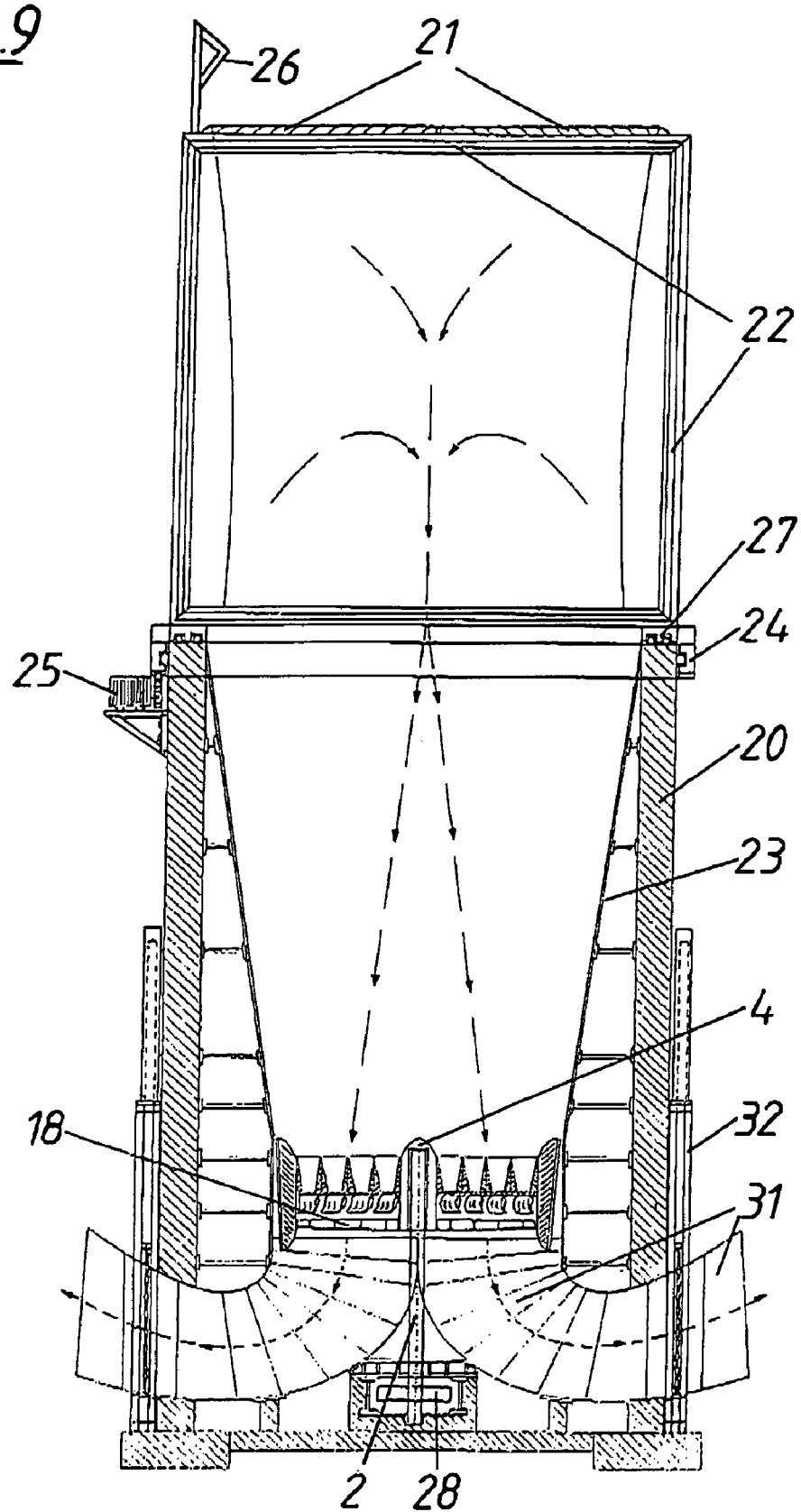
FIGS. 9 and 10 show in a sectional front and side view a wind power system in accordance with the invention which is arranged in a tower.
Figure 10:
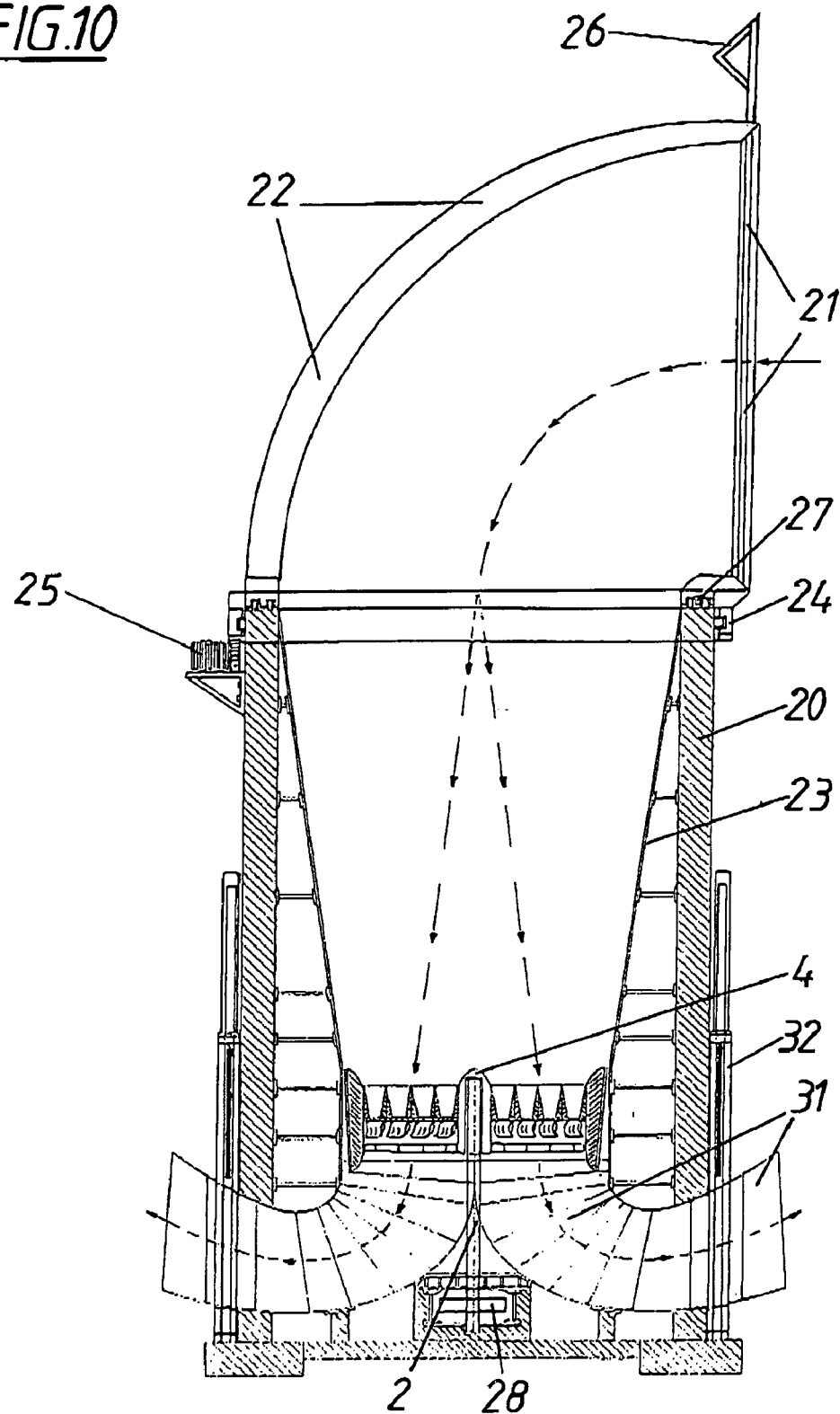
Figure 11:
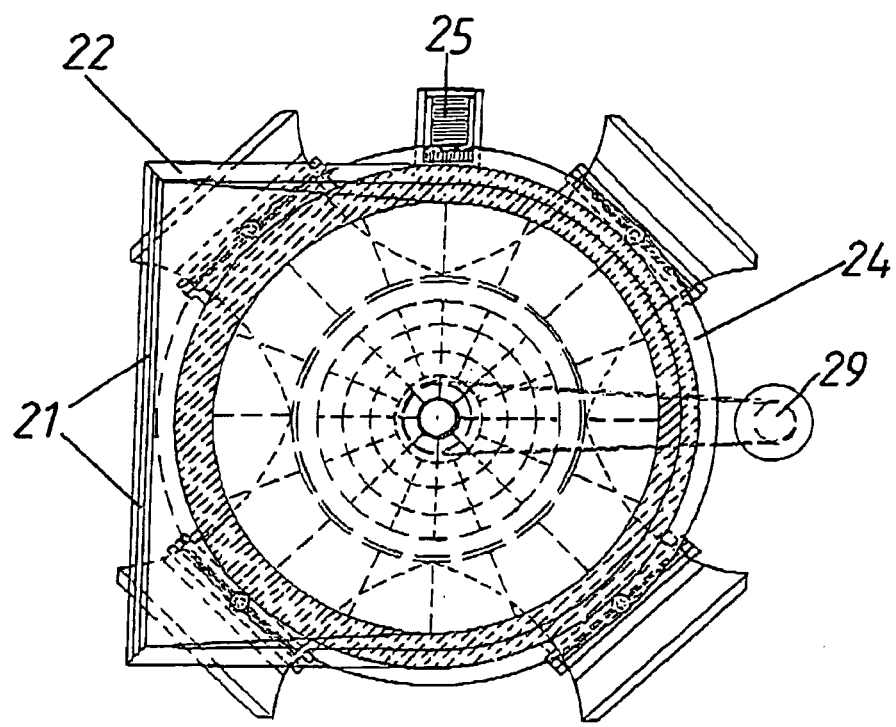
FIGS. 11 and 12 show a wind power system of FIGS. 9 and 10 in a partly sectional top view.
Figure 12:
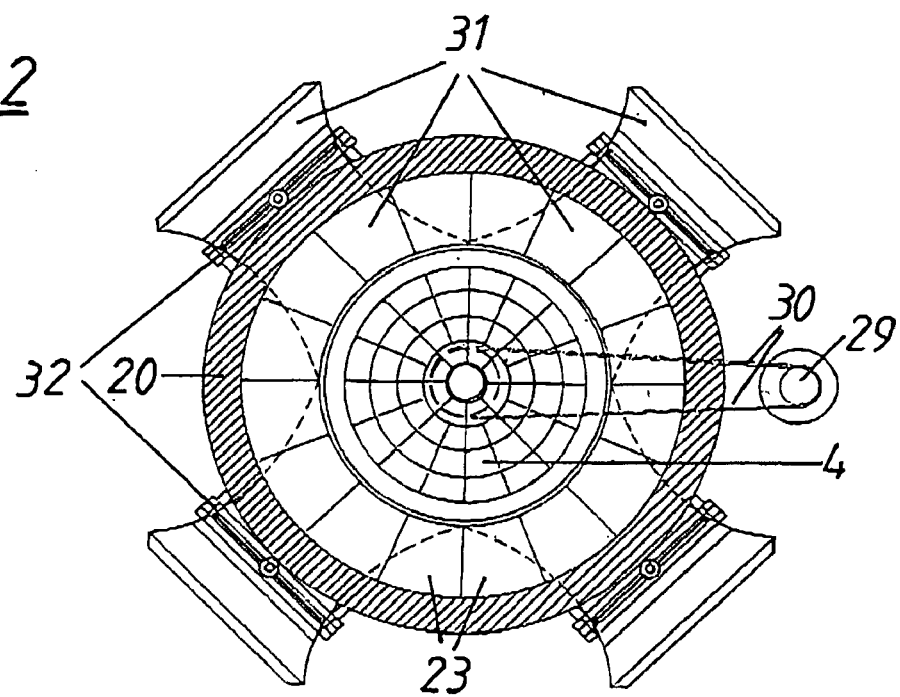

The flow conduits 6 expand after their tapering portion. For the purpose of increasing the degree of efficiency of the wind power system 1, the rotor blades can be provided with a wing profile. Preferably, the rotor blades 3 also form nozzle-like flow conduits between themselves, with the flow conduits tapering between the points m and n (FIG. 8) and then expanding again. The rotor blades 3 are provided with an adjustable configuration for adjustment to the prevailing wind speed. Similarly, guide walls 8 can be arranged in individual flow conduits 6 before the rotor blades 3. Said guide walls 8 for the air flow to assume a flow within the flow conduits 6 which is directed against the rotor blades.

Figures 1, 2:
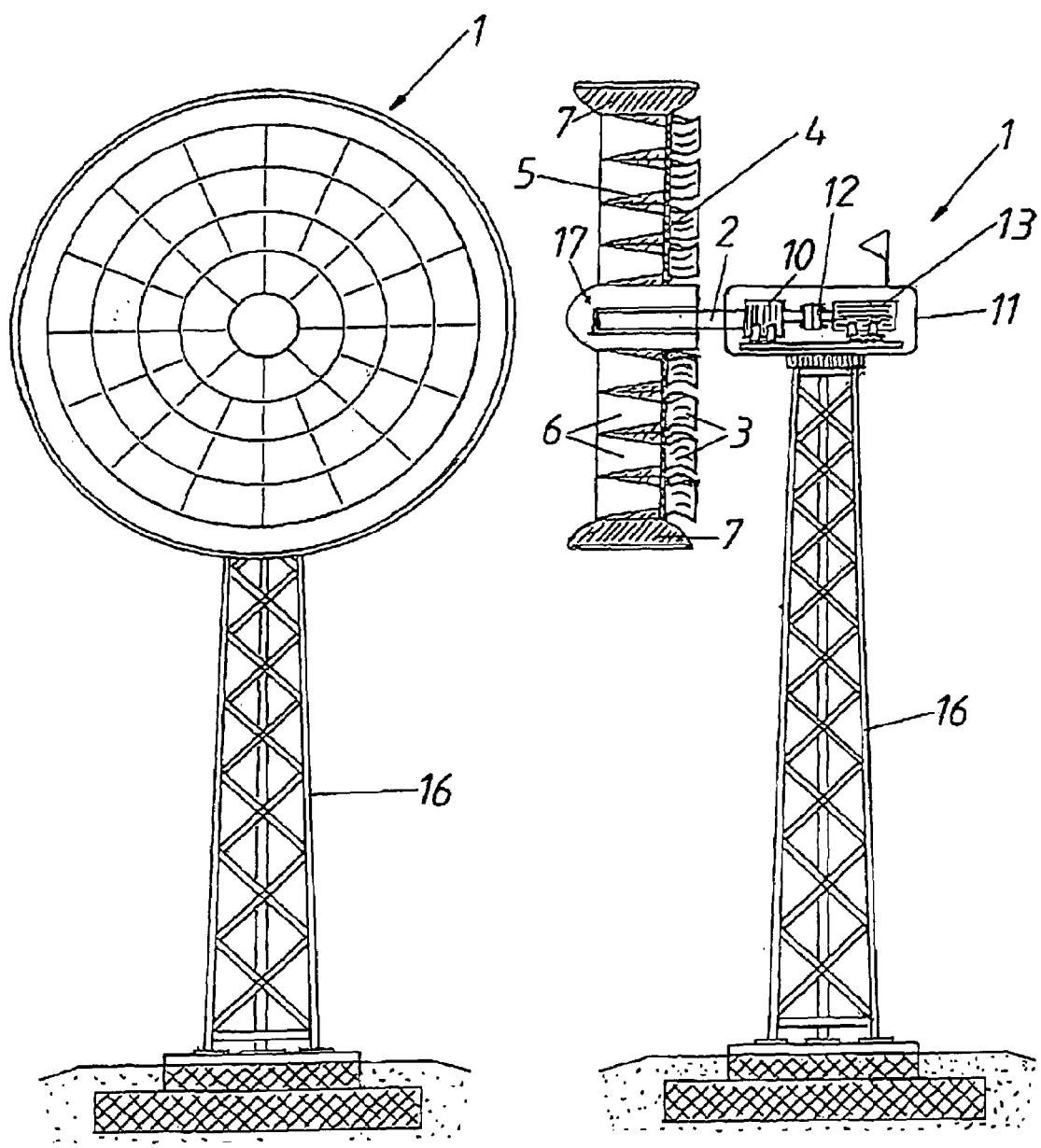
FIG. 1 shows a wind power system in accordance with the invention in a front view.
FIG. 2 shows the wind power system of FIG. 2 in a partially sectional side view.

The wind power system in accordance with the invention can be arranged on a mobile carrier vehicle 9 in accordance with FIGS. 4 and 5 in order to ensure the mobile use of the wind power system 1. The rotor 4 is fastened to the shaft 2 which is rotatably held in a housing 11 and is connected to a generator 13 via a gear 10 and a coupling 12, through which the wind power is converted into electric power. The wind power system 1 is mounted on an extension arm 14 of the carrier vehicle 9. The tracking of the wind by the wind power system 1 occurs by way of a live ring 15 on the carrier vehicle, e.g. by means of an electric motor engaging in the live ring 15. According to FIGS. 2 and 3, the wind power system 1 in accordance with the invention is mounted on a braced mast 16. The rotor 3 comprises a middle displacer 17 coaxially to the shaft 2, which displacer simultaneously forms a hub for receiving the rotor 4 and guides the air flow from the inner wheel region in which the efficiency would be very small due to the low distance to the rotational axis to the flow conduits situated further outside, which thus additionally increases the dynamic pressure in front of the rotor 4.

According to an embodiment of a wind power system 1 in accordance with the invention, the rotor 4 is held with a vertical axis in a tower 20 which comprises a tower head 21 which is adjustable coaxially to the rotor 4 and which comprises a pipe elbow 22 which deflects the horizontal wind flow against the rotor 4. The flow connection 23 of the pipe elbow 22 to the rotor 4 narrows in the direction of flow of the air flowing in through the pipe elbow 22 towards the rotor 4. The air flow is supplied to the rotor 4 via the tower head 21 held on the live ring 24. The tracking of the wind occurs by way of a live ring motor 25 which acts upon the live ring and which depending on the prevailing direction of the wind will be triggered by a wind direction sensor 26. The tower head 21 rests on the tower via a bearing 27.

Figure 13:
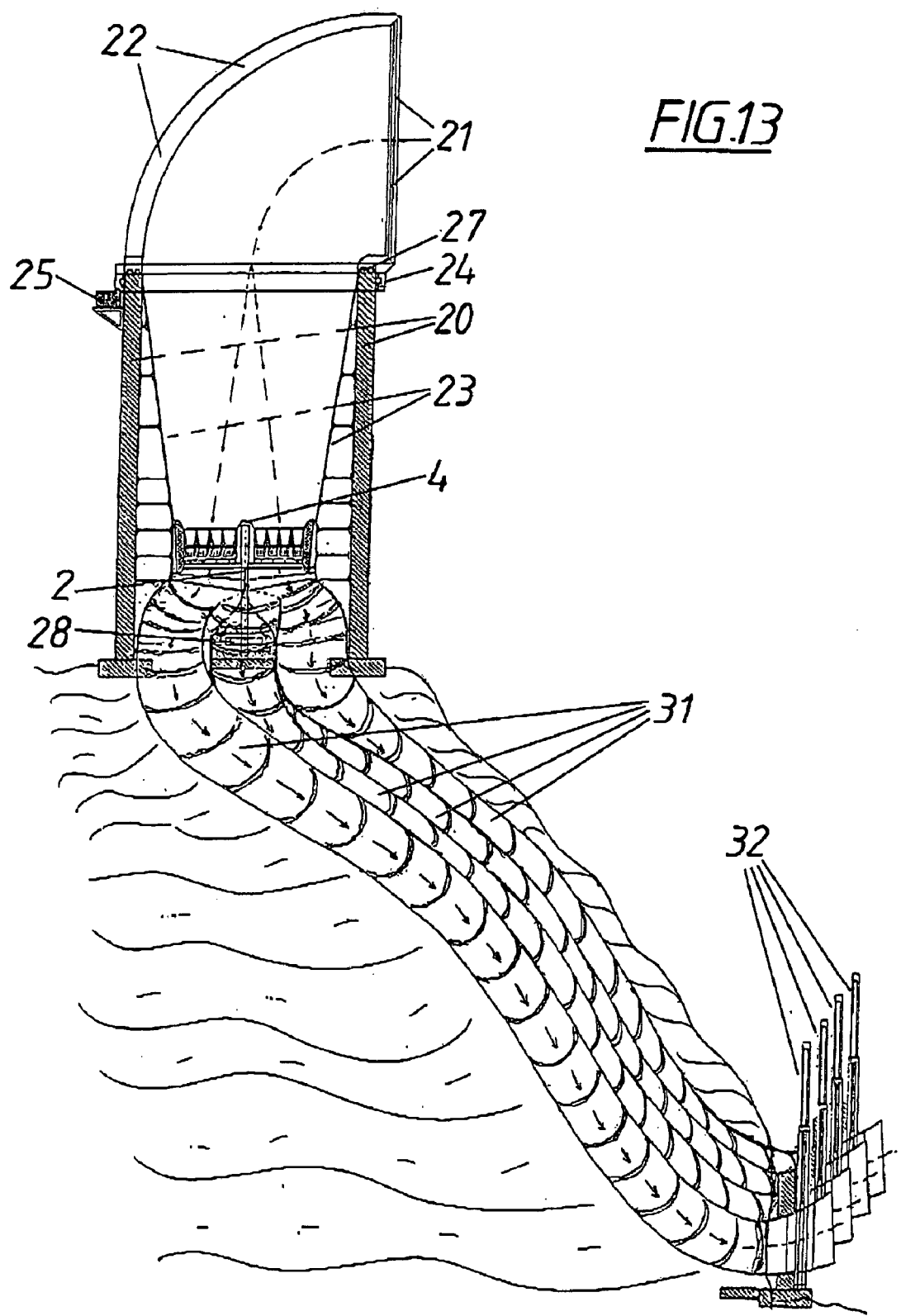
FIG. 13 shows a construction variant of the wind power system of FIGS. 9 through 12 in a partly sectional side view.

The rotor 4 is operatively connected on the one hand with a disk flywheel 28 arranged close to the floor of the tower and on the other hand with a generator 29. According to the embodiment, the generator 29 is driven by means of a flat belt 30 which acts upon the disk flywheel 28. The air flowing into the tower 20 leaves the tower 20 close to the tower floor via pipes 31. Adjustable valves 32 are provided at the end of the pipes 31 for regulating the air flow flowing through the wind power system 1. In the case that the area on which the wind power system is placed slopes at least on one side of the tower 20, the pipes 31 can be laid away from the turbine floor down along the ground (FIG. 13) in order to also utilize any prevailing pressure differences for generating power between air entrance and exit.

The invention claimed is:

1. A wind power system for generating power with a rotor which is axially flowed through, is rotatably held on a shaft and is provided with blades, and with a guide device which accelerates the air flow through the rotor, characterized in that the guide device (5) consists of several flow conduits (6) tapering in the direction of flow which conduits are arranged on the rotor (4) in a distributed way in the manner of a rim around a shaft (2), that the blades (3) are associated with one flow conduit (6) each, that the rotor (4) comprises an outside jacket (7) enclosing the same, and that the flow conduits (6) expand again after their tapering portion.

2. A wind power system as claimed in claim 1, wherein the blades (3) are each provided downstream of a flow conduit (6).

3. A wind power system as claimed in claim 1, wherein the blades (3) are provided in an adjustable configuration.

4. A wind power system as claimed in claim 1, wherein guide walls (8) are arranged in the flow conduits (6) before the blades (3).

5. A wind power system as claimed in claim 1, wherein the rotor (4) is associated with a disk flywheel (28) which is held coaxially to the rotor (4) and which is detachably connected with the rotor (4) by means of a coupling.

6. A wind power system as claimed in claim 5, wherein the disk flywheel (28) is arranged in the outside jacket (7).

7. A wind power system as claimed in claim 1, characterized by its mobile use on a carrier vehicle (9).

8. A wind power system for generating power with a rotor which is axially flowed through, is rotatably held on a shaft and is provided with blades, and with a guide device which accelerates the air flow through the rotor, characterized in that the guide device (5) consists of several flow conduits (6) tapering in the direction of flow which conduits are arranged on the rotor (4) in a distributed way in the manner of a rim around a shaft (2), that the blades (3) are associated With one flow conduit (6) each, that the rotor (4) comprises an outside jacket (7) enclosing the came, and that an auxiliary rotor (18) which is seated on an additional shaft and is axially flowed through is situated downstream of the rotor (4).

9. A wind power system as claimed in claim 8, wherein the auxiliary rotor (18) comprises adjustable rotor blades.

10. A wind power system as claimed in claim 8, wherein a braking device is associated with the rotor (40 and/or the auxiliary rotor (18).

11. A wind power system for generating power with a rotor which is axially flowed through, is rotatably held on a shaft and is provided with blades, and with a guide device which accelerates the air flow through the rotor, characterized in that the guide device (5) consists of several flow conduits (6) tapering in the direction of flow which conduits are arranged on the rotor (4) in a distributed way in the mariner of a rim around a shaft (2), that the blades (3) are associated With one flow conduit (6) each, that the rotor (4) comprises an outside jacket (7) enclosing the same, and that the rotor (4) with a vertical axis is held in a tower (20) which comprises a tower head (21) which is adjustable coaxially to the rotor (4) and comprises a pine elbow (22) which deflects the horizontal wind flow against the rotor (4) and the flow connection (23) of the pipe elbow (22) to the rotor (4) narrows in the direction of flow.

* * * * *